United States Patent

Madan et al.

[11] Patent Number: 5,821,275
[45] Date of Patent: Oct. 13, 1998

[54] FLEXIBLE FOAMS AND FLEXIBLE MOLDED FOAMS BASED ON LIQUID ISOCYANATE-TERMINATED ALLOPHANATE-MODIFIED MDI PREPOLYMER BLENDS AND PROCESSES FOR THE PRODUCTION OF THESE FOAMS

[75] Inventors: Sanjeev Madan, Coraopolis, Pa.; William E. Slack, Moundsville, W. Va.; Jay M. Capelli, Aliquippa, Pa.

[73] Assignee: Bayer Corporation, Pittsburgh, Pa.

[21] Appl. No.: 966,928

[22] Filed: Nov. 10, 1997

[51] Int. Cl.⁶ .................................................. C08G 18/10
[52] U.S. Cl. ............................................. 521/159; 521/176
[58] Field of Search ...................... 521/159, 176

[56] References Cited

U.S. PATENT DOCUMENTS

| | | | |
|---|---|---|---|
| 4,239,856 | 12/1980 | Rowton | 521/118 |
| 4,256,849 | 3/1981 | Ick et al. | 521/129 |
| 4,261,852 | 4/1981 | Carroll et al. | 528/59 |
| 4,365,025 | 12/1982 | Murch et al. | 521/159 |
| 4,478,960 | 10/1984 | Buethe et al. | 521/160 |
| 4,738,991 | 4/1988 | Narayan | 521/124 |
| 4,833,176 | 5/1989 | Wolf et al. | 521/160 |
| 4,866,103 | 9/1989 | Cassidy et al. | 521/159 |
| 4,876,292 | 10/1989 | Milliren | 521/159 |
| 4,945,117 | 7/1990 | Gansen et al. | 521/99 |
| 5,070,114 | 12/1991 | Watts et al. | 521/159 |
| 5,319,053 | 6/1994 | Slack et al. | 528/48 |
| 5,319,054 | 6/1994 | Slack et al. | 528/48 |
| 5,369,138 | 11/1994 | Gensen | 521/159 |
| 5,521,225 | 5/1996 | Gerber et al. | 521/155 |
| 5,521,226 | 5/1996 | Bleys | 521/174 |
| 5,624,972 | 4/1997 | Muller et al. | 521/159 |

FOREIGN PATENT DOCUMENTS

| | | |
|---|---|---|
| 0022617 | 1/1981 | European Pat. Off. . |
| 0031650 | 7/1981 | European Pat. Off. . |
| 994890 | 6/1965 | United Kingdom . |

*Primary Examiner*—Rachel Gorr
*Attorney, Agent, or Firm*—Joseph C. Gill; N. Denise Brown

[57] ABSTRACT

This invention relates to flexible foams and flexible molded foams prepared from an isocyanate blend comprising an allophanate modified MDI, a polyether polyol, and a polymethylene poly(phenyl isocyanate). The present invention also relates to processes for the production of these flexible foams and flexible molded foams.

28 Claims, No Drawings

FLEXIBLE FOAMS AND FLEXIBLE MOLDED FOAMS BASED ON LIQUID ISOCYANATE-TERMINATED ALLOPHANATE-MODIFIED MDI PREPOLYMER BLENDS AND PROCESSES FOR THE PRODUCTION OF THESE FOAMS

BACKGROUND OF THE INVENTION

This invention relates to flexible foams and flexible molded foams based on an isocyanate comprising liquid isocyanate-terminated allophanate modified MDI prepolymer blends, and to a process for the production of these flexible foams and flexible molded foams. More specifically, these isocyanates are blends comprising an allophanate modified MDI prepolymer and polymeric polyphenyl poly (methylene isocyanate) (PMDI). It is also possible to use an isocyanate comprising a blend of allophanate modified MDI with the PMDI and then form an isocyanate prepolymer.

Flexible polyurethane foams and processes for their preparation are known and are described in, for example, U.S. Pat. Nos. 4,478,960, 4,833,176, 4,876,292, 4,945,117, 5,070,114, 5,369,138, 5,521,225 and 5,521,226, and in European Patents 0010850 and 0022617. Mixtures of diphenylmethane diisocyanate (MDI), poly(phenylmethane isocyanate), prepolymers based on such materials, and toluene diisocyanate are known to be suitable for preparing flexible foams. See, for example, U.S. Pat. Nos. 4,239,856, 4,256,849, 4,261,852 and 4,365,025.

U.S. Pat. No. 5,070,114 discloses the preparation of flexible foams prepared from diphenylmethane diisocyanate (MDI) based prepolymers having a rather low NCO value and from an isocyanate-reactive composition comprising relatively high amounts of water.

U.S. Pat. No. 4,478,960 describes the preparation of flexible polyurethane foam from 1) a prepolymer based on MDI and optionally polymeric MDI, and a polyol having from 5 to 30% by wt. of oxyethylene groups, wherein the prepolymer has an NCO group content of 12 to 30% by wt., 2) polymeric MDI, if 1) above is MDI, 3) a polyol having a low EO content and 4) a blowing agent.

A process for the preparation of a flexible foam from a prepolymer having an NCO content of from 15 to 30% by wt. is disclosed by U.S. Pat. No. 4,945,117. These flexible foams are prepared from a polyol having a functionality of at least 4.

The preparation of flexible foams from polyisocyanate prepolymers is disclosed by U.S. Pat. No. 5,369,138. The prepolymer is reacted with water and a mixture of a polyol having a low oxyethylene content and a polyol having a high oxyethylene content.

U.S. Pat. No. 4,876,292 describes a particular isocyanate-reactive mixture suitable for preparing flexible polyurethane foams. This mixture comprises up to 3 parts by wt. of an amine corresponding to a specific formula, up to 30% by wt. of a polyoxyalkylene polyamine having a molecular weight of from about 400 to about 5000 and containing from 2 to 3 primary amino groups, and from 70 to 100% by wt. of one or more polyether polyhydroxyl compounds having hydroxyl functionalities of from 2 to 3 and molecular weights of from 1000 to 10,000. Polymethylene poly(phenyl isocyanates) or prepolymers thereof are suitable for reaction with these isocyanate-reactive mixtures.

The process for producing flexible foams disclosed by U.S. Pat. No. 5,521,225 comprises reacting a polyisocyanate composition having an NCO group content of 10 to 25% by wt., with a specific polyol composition. Suitable polyisocyanate compositions comprise a) an isocyanate prepolymer having an NCO content of 5 to 15% by wt. and being prepared by reacting an excess of polyisocyanate and a polyol of specified functionality, equivalent weight and EO content, and b) a polyisocyanate having an NCO content of 30 to 33% by wt.

Allophanate modified isocyanates are also known in the art. Various isocyanates containing allophanate groups and processes for their production are disclosed in, for example, U.S. Pat. Nos. 4,738,991, 4,866,103, 5,319,053 and 5,319,054, GB 994,890 and European Patents 0,031,650 and 0,393,903.

EP 0,031,650 describes flexible molded foams prepared from blends of allophanate modified MDI. However, these blends consist of an allophanate modified MDI which is the reaction product of an alcohol with an MDI based isocyanate comprising more than 20% by weight of the 2,4'-isomer of MDI.

EP 0,393,903 relates to the production of flexible foams from prepolymers of allophanate modified MDI. The allophanate modified MDI of this reference is the reaction product of a triol with 20% by weight of the 2,4'-isomer of MDI, followed by reaction with a polyether to form the prepolymer.

U.S. Pat. No. 4,738,991 is also of interest in that it discloses one example wherein a flexible foam is prepared. This flexible foam, however, is produced from an allophanate-modified isocyanate based on toluene diisocyanate which is prepared according to the process described therein.

The present invention has been found to produce flexible foams and flexible molded foams (having a density in the range of 2 to 8 pcf) with excellent physical properties. Increases of 200 to 400% have been obtained in tear strengths and tensile strengths without the disadvantage of poor compression sets which are normally associated with monomeric isocyanate based molded foams. The present invention also offers the advantages of molding harder foams (as measured by ILD—Indentation Load Deflection) at comparable density without the addition of filled polymers or other hardening additives. These advantages make flexible molded foams produced from this invention ideally suitable for applications in the furniture, toy, and automotive seating industries.

SUMMARY OF THE INVENTION

This invention relates to flexible foams and flexible molded foams prepared by reacting A) stable liquid allophanate modified polyisocyanate prepolymer blends, with B) an isocyanate-reactive component, in the presence of C) a blowing agent comprising water. These stable liquid allophanate modified polyisocyanate prepolymer blends have isocyanate group contents of from at least about 11 to less than about 32%, and comprises: a) an allophanate-group containing diisocyanate having an isocyanate group content of about 12 to about 31%, b) a polyether polyol having a hydroxyl functionality of from about 1.5 to about 4, and a molecular weight of about 100 to about 10,000, and c) a polymethylene poly(phenyl isocyanate) having an isocyanate group content of about 28 to about 33%.

Suitable stable liquid allophanate modified polyisocyanate prepolymer blends may be prepared in one of several ways. In one embodiment, these are prepared by first forming a liquid isocyanate-terminated allophanate-modified MDI prepolymer by reacting a) the allophanate modified diisocyanate and b) the polyether polyol, and blending this with c) a polymethylene poly(phenyl isocyanate) having the specified isocyanate group content, monomeric and polymeric contents, etc. In another embodiment, it is also possible that a) the allophanate-modified MDI is blended with c) the polymethylene poly(phenyl isocyanate) first, and then reacted with b) a polyether to form a prepolymer.

More specifically, the present invention relates to a flexible foam prepared by reacting:

A) a stable liquid, allophanate modified polyisocyanate prepolymer blend having an isocyanate group content of from at least about 11 to less than 32% by weight, and comprising:
1) from 65 to 98% by weight of an isocyanate-terminated allophanate modified prepolymer having an isocyanate content of about 11 to about 30% by weight, and being prepared by reacting:
   a) an allophanate-group containing diisocyanate having an isocyanate group content of from about 12 to about 31% by weight and being prepared by reacting an aliphatic and/or aromatic alcohol with a diphenylmethane diisocyanate comprising:
      i) from 0 to 60% by weight of 2,4'-diphenylmethane diisocyanate,
      ii) no more than 6% by weight of 2,2'-diphenylmethane diisocyanate,
      and
      iii) the balance being 4,4'-diphenylmethane diisocyanate,
      with the %'s by weight of a)i), a)ii) and a)iii) totalling 100%,
   with
   b) a polyether polyol having hydroxyl functionalities of from about 1.5 to about 4 and molecular weights of about 100 to about 10,000, preferably about 150 to about 6,200,
   and
2) from 2 to 35% by weight of a polymethylene poly(phenyl isocyanate) having an isocyanate group content of from about 28% to about 33%, and comprising:
   i) from 0 to 50% by weight of 2,4'-diphenylmethane diisocyanate,
   ii) no more than 6% by weight of 2,2'-diphenylmethane diisocyanate,
   iii) from 20 to 80% by weight of 4,4'-diphenylmethane diisocyanate,
   and
   iv) from 10 to 70% by weight of higher functional isocyanates of the diphenylmethane series,
   with the %'s by weight of A)2)i), A)2)ii), A)2)iii) and A)2)iv) totalling 100% by weight;

with
B) an isocyanate-reactive component comprising:
1) from about 80 to about 99.999% by weight, based on the total weight of component B), of one or more polyether polyols having a hydroxyl functionality of from about 1.5 to 6, preferably about 2 to 3, and a molecular weight of from about 1,000 to about 10,000, preferably of from about 1,000 to 6,200,
and
2) from about 0.001 to about 20% by weight, based on the total weight of component B), of one or more organic compounds having molecular weights of from 90 to less than 1,000, preferably of from about 100 to about 500, and containing from 2 to 4 isocyanate-reactive groups, preferably 2 to 3 isocyanate-reactive groups, in the presence of
C) a blowing agent comprising water,
and, optionally,
D) additives,
with the amounts of components A), B) and C) being such that the isocyanate index is from 60 to 120.

Flexible molded foams prepared as described above are another aspect of the present invention. In a preferred embodiment, the polyether polyol, i.e., component B)1), is present in an amount of from about 99.0% to about 99.996% by weight, based on the total weight of component B), and the relatively lower molecular weight organic compound, i.e., component B)2), is present in an amount of from about 0.004% to about 1.0% by weight, based on the total weight of component B).

Another embodiment of the present invention comprises flexible foams prepared from an isocyanate blend wherein the blend comprises:

A) a stable liquid allophanate modified polyisocyanate prepolymer blend having an isocyanate group content of from at least about 11% to less than 32% by weight, and comprising the reaction product of:
1) an isocyanate blend prepared by mixing:
   a) from 65 to 98% by weight of a stable liquid, allophanate-group containing diisocyanate having an isocyanate group content of from about 12 to about 31% by weight and being prepared by reacting an aliphatic and/or an aromatic alcohol with a diphenylmethane diisocyanate comprising:
      i) from 0 to 60% by weight of 2,4'-diphenylmethane diisocyanate,
      ii) no more than 6% by weight of 2,2'-diphenylmethane diisocyanate,
      and
      iii) the balance being 4,4'-diphenylmethane diisocyanate,
      with the %'s by weight of A)1)a)i), A)1)a)ii) and A)1 )a)iii) totalling 100%;
   and
   c) from 2 to 35% by weight of a polymethylene poly(phenyl isocyanate) having an isocyanate group content of from about 28 to about 33% by weight, and comprising:
      i) from 0 to 50% by weight of 2,4'-diphenylmethane diisocyanate,
      ii) no more than 6% by weight of 2,2'-diphenylmethane diisocyanate,
      iii) from 20 to 80% by weight of 4,4'-diphenylmethane diisocyanate,
      and
      iv) from 10 to 70% by weight of higher functional isocyanates of the diphenylmethane series,
      with the %'s by weight of A)1)c)i), A)1)c)ii), A)1)c)iii) and A)1)c))iv) totalling 100% weight;
with
2) a polyether polyol having a hydroxyl functionality of from about 1.5 to about 4, and a molecular weight of from about 100 to about 10,000, preferably 150 to 6,200.

This embodiment requires the same isocyanate-reactive component B), blowing agent C) and, optionally, additives D) as described hereinabove. Flexible molded foams prepared as described above.

Moreover, the present invention relates to flexible foams, flexible molded foams, and to processes for the production of these flexible foams and for the production of these flexible molded foams wherein the isocyanate component comprises the stable liquid allophanate-modified polyisocyanate prepolymer blends and polyol blends described above.

DETAILED DESCRIPTION OF THE INVENTION

Suitable isocyanates to be used as component A) in the present invention are stable liquid allophanate modified polyisocyanate prepolymer blends having an isocyanate group content of from greater than about 11% to less than about 32%, preferably from at least about 13.0% to less than about 30.5%, most preferably from about 15.65 to about 29.1% by weight. Isocyanates suitable for this invention may be prepared in several different ways. Suitable isocyanates include, for example, blends of 1) 65 to 98% by weight isocyanate-terminated prepolymers prepared by reacting a) an allophanate group containing diisocyanate with b) a polyether polyol; and 2) 2 to 35% by weight of a polyisocyanate of the diphenylmethane series which has a functionality of greater than about 2.0. Suitable isocyanates also include those wherein a) an allophanate group containing diisocyanate is first blended with c) a polyisocyanate of the diphenylmethane series having a functionality of greater than about 2.0, and then reacted with 2) a polyether polyol to form the presently required stable liquid allophanate modified polyisocyanate prepolymer blend having an isocyanate group content of from greater than about 11% to less than about 32%.

For use in the present invention, suitable a) allophanate-group containing diisocyanates include those having an isocyanate group content of from about 12% (preferably from about 17%) to about 31% (preferably to about 29%) by weight. These are prepared by reacting an aliphatic alcohol and/or an aromatic alcohol, with a diphenylmethane diisocyanate which comprises: i) from 0% to 60%, preferably 1% to 10% by weight of 2,4'-diphenylmethane diisocyanate, ii) no more than 6%, preferably less than 2% by weight of 2,2'-diphenylmethane diisocyanate, and iii) the balance being 4,4'-diphenylmethane diisocyanate; with the %'s by weight of i), ii) and iii) totalling 100% by weight. These allophanate-modified diisocyanates are described in, for example, U.S. Pat. No. 5,319,053, the disclosure of which is herein incorporated by reference.

Suitable prepolymers of these allophanate-modified MDI based diisocyanates have an isocyanate group content of from about 11% (preferably from about 15%) to about 30% (preferably to about 27%) by weight. Such prepolymers can be prepared by reacting a) the allophanate-modified MDI as described above with b) a polyether polyol. These prepolymers and their preparation are also described in, for example, U.S. Pat. No. 5,319,053, the disclosure of which is herein incorporated by reference.

Suitable b) polyether polyols for the preparation of these prepolymers have hydroxyl functionalities of from about 1.5 to about 4, preferably 2 to 3, and molecular weights of from about 100 to about 10,000, preferably about 150 to 6,200. Some examples of suitable polyether polyols for this portion of the reaction include compounds such as, for example, glycerol, propylene glycol, trimethylolpropane, ethylene glycol, diethylene glycol, butylene glycol-(1,4) and -1(1,3); hexanediol-(1,6); octanediol-(1,8); neopentyl glycol, cyclohexanedimethanol (1,4-bis-hydroxymethyl-cyclohexane); 2-methyl-1,3-propanediol; 2,2,4-trimethyl-1,3-pentanediol, triethylene glycol, tetraethylene glycol, polyethylene glycol, dipropylene glycol, etc. Other suitable polyether polyols are the alkoxylation products of the suitable starter compounds such as, for example, those described above, with suitable alkylene oxides such as, for example, ethylene oxide, propylene oxide, butylene oxide, styrene oxide, tetrahydrofuran, epichlorohydrin, etc., either alone or as mixtures. The alkylene oxides may be used sequentially with one another.

It is, of course, also possible to use liquid polyether polyols containing a very low concentration of unsaturated, low molecular weight mono-hydroxyl moieties (monol). Such liquid polyether polyols are commercially available under the tradename Acclaim polyether polyols, from ARCO Chemicals.

It is possible for the stable liquid allophanate modified polyisocyanate prepolymer blend A) to comprise 1) an isocyanate blend prepared by mixing a) 65 to 98% by weight, preferably 70 to 95%, more preferably 70 to 90%, and most preferably 75 to 90% by weight, based on 100% by weight of components A)1)a) and A)1)c), of the allophanate-modified diisocyanates as described above, and c) 2 to 35% by weight, preferably 5 to 30%, more preferably 10 to 30%, and most preferably 10 to 25% by weight, based on 100% by weight of components A)1)a) and A)1)c), of a polymethylene poly(phenyl isocyanate) having an isocyanate group content of from 28 to 33% by weight. Suitable polymethylene poly(phenyl isocyanates) comprise: i) from 0 to 50%, preferably 2 to 20% by weight of 2,4'-diphenylmethane diisocyanate, ii) no more than 6%, preferably less than 2% by weight of 2,2'-diphenylmethane diisocyanate, iii) from 20 to 80%, preferably 40 to 56% by weight of 4,4'-diphenylmethane diisocyanate, and iv) from 10 to 70%, preferably 20 to 60% by weight of higher functional isocyanates of the diphenylmethane series; with the %'s by weight of A)1)c)i), A)1)c)ii), A)1)c)iii) and A)1)c)iv) totalling 100% by weight. This isocyanate blend A)1) is then reacted with 2) a polyether polyol having a hydroxyl functionality of from about 1.5 to 4, and a molecular weight of from about 100 to 10,000, preferably 150 to 6,200 (described above as component b) hereinabove).

Suitable polyether polyols to be used as component B)1) in the present invention comprise one or more polyether polyols having a hydroxyl functionality of from about 1.5 to about 6, preferably about 2 to 3, and a molecular weight of from about 1,000 to about 10,000, preferably about 1,000 to about 6,200.

The high molecular weight polyethers suitable for use in accordance with the invention are known and may be obtained, for example, by polymerizing tetrahydrofuran or epoxides such as, for example, ethylene oxide, propylene oxide, butylene oxide, styrene oxide or epichlorohydrin in the presence of suitable catalysts, such as, for example, $BF_3$ or KOH, or by chemically adding these epoxides, preferably ethylene oxide and propylene oxide, in admixture or successively to starter compounds which contain reactive hydrogen atoms such as water, alcohols or amines. Examples of suitable compounds to be used as starters for the high molecular weight polyethers include, for example, alcohols and amines including, for example, the low molecular weight chain extenders set forth hereinafter, as well as compounds such as propylene glycol, glycerin, ethylene glycol, triethanolamine, water, trimethylolpropane, bisphenol A, sucrose, aniline, ammonia, ethanolamine, ethylene diamine, sorbitol, etc. Suitable compounds also include the polyether polyols commercially available under the tradename Acclaim from ARCO Chemical Company. These polyether polyols contain a low concentration of unsaturated, low molecular weight mono-hydroxyl moieties (monol), and are prepared with a zinc hexacyanocobaltate catalyst. It is preferred to use polyethers which contain substantial amounts of primary hydroxyl groups in terminal positions (greater than 50% by weight, based on all of the terminal hydroxyl groups present in the polyether). These preferred compounds include copolymers of ethylene oxide and propylene oxide started with glycerine.

In addition, the present invention requires from about 0.001% to about 20% by weight, based on the total weight of component B), of component B)2), one or more organic compounds having molecular weights of from 90 to less than 1,000, preferably of from about 100 to about 400, and containing from 2 to 4 (preferably 2 to 3) isocyanate-reactive groups. Suitable organic compounds are selected from the group consisting of polyols, amines, and aminoalcohols.

Suitable organic compounds having molecular weights of from about 90 to less than 1,000, preferably of from 100 to 400, and containing from 2 to 4, preferably 2 to 3 isocyanate-reactive groups, and which are suitable for use as component B)2) according to the present invention, include, for example, diols, triols, tetraols, diamines, triamines, polyamines, aminoalcohols, etc. Of course, it is also possible to use a mixture of these various compounds. Suitable diols and triols include, for example, 2-methyl-1,3-propanediol, ethylene glycol, 1,2- and 1,3-propanediol, 1,3- and 1,4- and 2,3-butanediol, 1,6-hexanediol, 1,10-decanediol, diethylene glycol, triethylene glycol, tetraethylene glycol, dipropylene glycol, tripropylene glycol, glycerol, trimethylolpropane, neopentyl glycol, cyclohexane-dimethanol, 2,2,4-trimethylpentane-1,3-diol, and pentaerythritol; and alkylene oxide adducts, such as, for example, ethylene oxide and/or propylene oxide, of these diols and triols provided that the above molecular weight limits are satisfied. Preferred diols and triols include, for example, 2-methyl-1,3-propanediol, trimethylol propane, diethylene glycol and triethylene glycol. Propylene oxide adducts and propylene oxide/ethylene oxide adducts of trimethylol propane, glycerine and propylene glycol are also preferred.

Some examples of suitable aminoalcohols to be used in the present invention include compounds such as, for example, monoethanolamine, diethanolamine, triethanolamine, diisopropanolamine, aminoethylethanolamine, etc. Preferred aminoalcohols are triethanolamine and monoethanolamine.

Suitable amine compounds to be used in accordance with the present invention include, for example, organic primary amines and/or secondary amines having from 2 to 4 amine groups, preferably 2 to 3 amine groups. Some examples of these compounds include 2-methyl-1,5-pentane diamine (Dytek A), ethylene diamine, 1,3-diaminopropane, 1,4-diaminobutane, isophoronediamine, diethylenetriamine, diaminocyclohexane, hexamethylenediamine, methyliminobispropylamine, iminobispropylamine, bis(aminopropyl)-piperazine, aminoethyl piperazine, 1,2-diaminocyclohexane, polyoxyalkyleneamines, bis-(p-aminocyclohexyl)methane, triethylenetetramine, tetraethylenepentamine, mixtures thereof, and the like.

Other suitable amines include, for example, aromatic polyamines, including diamines, having molecular weights of 90 to less than 1,000, preferably of from 100 to 400. These aromatic diamines include, for example, 1-methyl-3,5-diethyl-2,4-diamino benzene, 1-methyl-3,5-diethyl-2,6-diamino benzene, 1,3,5-trimethyl-2,4-diamino benzene, 1,3,5-triethyl-2,4-diamino benzene, 2,4,6-triethyl-1,3-diamino benzene, 3,5,3',5'-tetraethyl-4,4'-diamino diphenylmethane, 3,5,3',5'-tetraisopropyl-4,4'-diamino diphenylmethane, 3,5-diethyl-3',5'-diisopropyl4,4'-diamino diphenylmethane, 3,5-diethyl-5,5'-diisopropyl4,4'-diamino diphenylmethane, 1-methyl-2,6-diamino-3-isopropylbenzene, metaxylene diamine, and mixtures of the above diamines, such as, for example, mixtures of 1-methyl-3,5-diethyl-2,4-diamino benzene and 1-methyl-3,5-diethyl-2,6-diamino benzene in a weight ratio between about 50:50 to 85:15, preferably about 65:35 to 80:20.

In addition, aromatic polyamines may be used in admixture with the sterically hindered chain extenders and include, for example, 2,4- and 2,6-diamino toluene, 2,4'- and/or 4,4'-diaminodiphenylmethane, 1,2- and 1,4-phenylene diamine, naphthalene-1,5-diamine and triphenyl-methane-4, 4',4"-triamine. The difunctional and polyfunctional aromatic amine compounds may also exclusively or partly contain secondary amino groups such as 4,4'-di-(methylamino)-diphenylmethane or 1-methyl-2 -methylamino-4-aminobenzene. Liquid mixtures of polyphenyl polymethylene-polyamines, of the type obtained by condensing aniline with formaldehyde, are also suitable.

Preferred amine compounds are 2,4,6-triethyl-1,3-diamino benzene, 2-methylpentamethylenediamine, metaxylene diamine, ethylene diamine, 1-methyl-3,5-diethyl-2, 4-diaminobenzene and mixtures thereof.

Suitable blowing agents for the present invention comprise water. In addition, it is also possible that water may be used in conjunction with other blowing agents such as, for example, pentane, cyclopentane, acetone, partially or completely fluorinated hydrocarbons, and methylene chloride. Liquid carbon dioxide is also a suitable blowing agent. It is preferred, however, that water is used as the sole blowing agent.

When water is used as the sole blowing agent, it is typically used in the present invention in quantities of between about 0.5 to 9% by weight, and preferably between about 2 to 6% by weight, based on 100% by weight of the polyol-side (B-side) of the formulation. The polyol-side of the formulation refers to the isocyanate-reactive component, any blowing agents, additives, catalysts, etc., as well as any other components which may be present except for the isocyanate component (i.e., component A)). Of course, as described above, water may be used in combination with other blowing agents. The above ranges for water as a sole blowing agent are exceeded when mixtures of water and another blowing agent are used in the present invention. Blowing agent mixtures of this type are required to be present in quantities which are typical of a conventional process for producing flexible foams and flexible molded foams. In some cases, this varies from 10 to 25% by weight, based on 100% by weight of the polyol-side of the formulation.

Catalysts are also required to be present in the reaction mixture according to the present invention. Suitable catalysts include, for example, tertiary amine catalysts and organometallic catalysts.

Some examples of suitable organometallic catalysts include, for example organometallic compounds of tin, lead, iron, bismuth, mercury, etc. Preferred organotin catalysts include compounds such as, for example, tin acetate, tin octoate, tin ethylhexanoate, tin oleate, tin laurate, dimethyltin dilaurate, dibutyltin oxide, dibutyltin dichloride, dimethyltin dichloride, dibutyltin diacetate, diethyltin diacetate, dimethyltin diacetate, dibutyltin dilaurate, diethyltin dilaurate, dimethyltin dilaurate, dibutyltin maleate, dimethyltin maleate, dioctyltin diacetate, dioctyltin dilaurate, di(2-ethylhexyl)tin oxide, etc. Delayed action or heat-activated tin catalysts such as, for example, dibutyltin dimercaptide, dibutyltin diisooctylmercaptoacetate, dimethyltin dimercaptide, dibutyltin dilaurylmercaptide, dimethyltin dilaurylmercaptide, dimethyltin diisooctylmercaptoacetate, di(n-butyl)tin bis(isooctylmercaptoacetate), and di(isooctyl) tin bis(isooctylmercapto-acetate), all of which are commercially available from Witco Chemical Corp., are especially preferred. Topcat 190, commercially available from Tylo Industries, New Jersey, is another suitable delayed action tin catalyst for the present invention. The use of a delayed action catalyst such as an iron pentanedione or a bismuth carboxylate, as described in U.S. Pat. No. 4,611,044, herein incorporated by reference, is also possible.

Suitable heat-activated catalysts for the present invention are amine salts. These catalysts include aliphatic and aromatic tertiary amines. Suitable heat-activated amine salts include compounds such as, for example, DABCO 8154 commercially available from Air Products, a formic acid blocked 1,4-diaza-bicyclo[2.2.0]octane, and other delayed action catalysts such as DABCO WT, also commercially available from Air Products; and Polycat SA-1, Polycat SA-102 and Polycat SA 610/50 which are acid-blocked versions of 1,8-diazabicyclo[5.4.0]undecene-7 (i.e., Polycat DBU) and commercially available from Air Products. Trialkyl amines and heterocyclic amines are also suitable for the present invention. Suitable compounds include, for example, trimethylamine, triethylamine, tripropylamine, tributylamine, dimethylcyclohexylamine, dibutylcyclohexylamine, dimethylethanolamine, triethanolamine, diethylethanolamine, ethyldiethanolamine, dimethylisopropanolamine, triisopropanolamine, triethylene diamine, tetramethyl-1,3-butanediamine, N,N,N',N'-tetramethylethylenediamine, N,N,N',N'-tetramethylhexanediamine-1,6, N,N,N',N',N"-pentamethyldiethylenetriamine, bis(2-dimethylaminoethoxy)-methane, N,N,N'-trimethyl-N'-(2-hydroxyethylethyldiamine, N,N-dimethyl-N',N'-(2-hydroxyethyl)-ethylenediamine, tetramethylguanidine, N-methylpiperidine, N-ethyl-piperidine, N-methylmorpholine, N-ethylmorpholine, 1,4-dimethyl-piperidine, 1,2,4-trimethylpiperidine, N-(2-dimethylaminoethyl)-morpholine, 1-methyl4-(2-dimethylamino)-piperidine, 1,4-diazabicyclo-[2.2.2]octane, 2-methyl-1,4-diazabicyclo[2.2.2]octane quinuclidine, 1,5-diazabicyclo[5.4.0]-5-undecene, and 1,5-diazabicyclo [4.3.0]-5-nonane.

Organometallic catalysts are usually used in amounts ranging from about 0.005 to about 0.7% by weight, preferably about 0.02 to 0.4% by weight, based on 100% by weight of the polyol-side (B-side) of the formulation. Tertiary amine catalysts, or salts thereof, are advantageously used in amounts ranging from about 0.05 to about 3% by weight, preferably about 0.25 to about 1.5% by weight, based on 100% by weight of the polyol-side (B-side) of the formulation. It is preferred that the total quantity of catalysts be such that they comprise less than 2% by weight, based on 100% by weight of the polyol-side (B-side) of the formulation.

Combinations of organometallic and tertiary amine catalysts are also suitable for the present invention. Mixtures of amine catalysts are preferred. Suitable mixtures of tertiary amine catalysts include, for example, 0.23% of Niax A-1, 0.42% of Niax A-4, 0.26% of Dabco 33-LV and 0.61% of RC6410.

It is also possible that various additives and/or auxiliary agents may be included in the formulation. Some examples of suitable additives include surface-active additives such as emulsifiers and foam stabilizers. Examples of these include N-stearyl-N',N'-bis-hydroxyethyl urea, oleyl polyoxyethylene amide, stearyl diethanol amide, isostearyl diethanolamide, polyoxyethylene glycol monoleate, a pentaerythritol/adipic acid/oleic acid ester, a hydroxy ethyl imidazole derivative of oleic acid, N-stearyl propylene diamine and the sodium salts of castor oil sulfonates or of fatty acids. Alkali metal or ammonium salts of sulfonic acid such as dodecyl benzene sulfonic acid or dinaphthyl methane sulfonic acid and also fatty acids may be used as surface-active additives.

Suitable foam stabilizers include water-soluble polyether siloxanes. The structure of these compounds is generally such that a copolymer of ethylene oxide and propylene oxide is attached to a polydimethyl siloxane radical. Such foam stabilizers are described in U.S. Pat. No. 2,764,565.

In addition to the surface-active agents, other additives which may be used in the molding compositions of the present invention include known internal mold release agents, pigments, cell regulators, flame retarding agents, plasticizers, dyes, fillers and reinforcing agents such as glass in the form of fibers or flakes or carbon fibers.

The compositions according to the present invention may be molded using conventional processing techniques at isocyanate indexes ranging from about 60 to 120 (preferably from 70 to 110). By the term "Isocyanate Index" (also commonly referred to as "NCO index"), is defined herein as the equivalents of isocyanate, divided by the total equivalents of isocyanate-reactive hydrogen containing materials, multiplied by 100.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all parts and percentages are parts by weight and percentages by weight, respectively.

EXAMPLES

The following components were used in the examples of the present invention.

ISO A: an allophanate modified diisocyanate prepolymer based on diphenylmethane diisocyanate, having an NCO group content of about 23.1% by weight, and a viscosity of about 248 cps at 25° C. This isocyanate was prepared by reacting 95.6 parts by weight (pbw) of 98% of 4,4'-MDI and 2% of 2,4'-MDI, with 4.4 pbw of 1-butanol at 60° C. 0.0075 pbw of zinc acetylacetate catalyst was added and the reaction temperature is increased to 90° C. to form the allophanate. After 1.5 hr. at 90° C., 0.015 pbw benzoyl chloride was added and the reaction mixture is cooled to 60° C. Next, 15.0 pbw of a propoxylated propylene glycol polyether having an OH number of 56 and a functionality of 2 was added and the reaction mixture was held at 60° C. for 1.5 hr., and then cooled to 25° C.

ISO B: an allophanate modified diisocyanate prepolymer based on diphenylmethane diisocyanate having an NCO group content of about 23.0% by weight, and having a viscosity of about 230 cps at 25° C. This allophanate modified isocyanate prepolymer was prepared by reacting 95.6 parts by weight (pbw) of 98% of 4,4'-MDI and 2% of 2,4'-MDI, with 4.4 pbw of 1-butanol at 60° C. 0.0075 pbw of zinc acetylacetate catalyst was added and the reaction temperature is increased to 90° C. to form the allophanate. After 1.5 hr. at 90° C., 0.015 pbw benzoyl chloride was added and the reaction mixture is cooled to 60° C. Next, 15.0 pbw of a propoxylated glycerin polyether polyol having an OH number of 56 and a functionality of 3 was added and the reaction mixture was held at 60° C. for 1.5 hr., and then cooled to 25° C.

ISO C: an allophanate modified diisocyanate prepolymer based on diphenylmethane diisocyanate having an NCO group content of about 22.9% by weight, and having a viscosity of about 265 cps at 25° C. This allophanate modified isocyanate prepolymer was prepared by reacting 95.6 parts by weight (pbw) of 98% of 4,4'-MDI and 2% of 2,4'-MDI, with 4.4 pbw of 1-butanol at 60° C. 0.0075 pbw of zinc acetylacetate catalyst was added and the reaction temperature is increased to 90° C. to form the allophanate. After 1.5 hr. at 90° C., 0.015 pbw benzoyl chloride was added and the reaction mixture is cooled to 60° C. Next, 16.0 pbw of a glycerin started propylene oxide/ethylene oxide (87:13 wt. ratio) polyether having an OH number of 28 and a functionality of 3 was added and the reaction mixture was held at 60° C. for 1.5 hr., and then cooled to 25° C.

ISO D: an allophanate modified diisocyanate prepolymer based on diphenylmethane diisocyanate having an NCO group content of about 22.9% by weight, and having a viscosity of about 253 cps at 25° C. This allophanate modified isocyanate prepolymer was prepared by reacting 95.6 parts by weight (pbw) of 98% of 4,4'-MDI of 2,4'-MDI, with 4.4 pbw of 1-butanol at 60° C. 0.0075 pbw of zinc acetylacetate catalyst was added and the reaction temperature is increased to 90° C. to form the allophanate. After 1.5 hr. at 90° C., 0.015 pbw benzoyl chloride was added and the reaction mixture is cooled to 60° C. Next, 16.0 pbw of a propylene glycol started propylene oxide/ethylene oxide (80:20 wt. ratio) polyether polyol having an OH number of 28 and a functionality of 2 was added and the reaction mixture was held at 60° C. for 1.5 hr., and then cooled to 25° C.

ISO E: a polymeric polymethylene polyisocyanate having an NCO group content of about 32.5% by weight, a functionality of about 2.2, having a total monomer content of about 74% which comprises about 52% of the 4,4'-isomer, about 19% of the 2,4'-isomer and about 3% of the 2,2'-isomer, and about 26% by weight of higher molecular weight homologues of the MDI series.

ISO F: a polymeric polymethylene polyisocyanate having an NCO group content of about 32.3% by weight, a functionality of about 2.4, and having a total monomer content of about 64% which comprises about 45% of the 4,4'-isomer, about 17% of the 2,4'-isomer and about 2% of the 2,2'-isomer, and about 36% by weight of higher molecular weight homologues of the MDI series.

ISO G: a polymeric polymethylene polyisocyanate having an NCO group content of about 32.8% by weight, a functionality of about 2.2 and having a total monomer content of about 78% by weight wherein about 55% is the 4,4'-isomer, about 20% is the 2,4'-isomer and about 3% is the 2,2'-isomer, and containing about 22% by weight of higher molecular weight homologues of the MDI series.

Polyol A: a polyether triol having an OH number of about 28, and being prepared from glycerine, propylene oxide and ethylene oxide, the weight ratio of PO to EO being about 87:13.

Polyol B: a polyether having an OH number of about 100 and a functionality of about 6, and being prepared from sorbitol, propylene oxide and ethylene oxide, the weight ratio of PO to EO being about 17.8:82.8.

Amine A: 2-methylpentamethylene diamine having a molecular weight of 116, commercially available as Dytek A from DuPont Chemicals.

CAT A: a tertiary amine containing catalyst comprising 33% triethylene diamine in dipropylene glycol, commercially available from Air Products Inc. as Dabco 33LV.

CAT B: 70% bis(dimethylaminoethyl)ether and 30% dipropylene glycol; a catalyst commercially available from OSi-Witco Chemical Corporation as NIAX A-1.

CAT C: a catalyst blend consisting of a tertiary amine and a surfactant, which promotes the water/isocyanate reaction; commercially available from OSi-Witco Chemical Corporation as NIAX A4.

CAT D: a mixture of tertiary amines and dipropylene glycol; a commercially available catalyst from Rhein Chemie Corporation as RC6410.

ADD 1: a silicon surfactant; commercially available as E9924 from Bayer Corporation.

The polyol formulation set forth in Table 1 was used in Examples 1–11 of the present invention.

TABLE 1

| Components | Polyol Blend 1 |
|---|---|
| Polyol A | 92.44 |
| Polyol B | 1.85 |
| Amine A | 0.46 |
| CAT A | 0.24 |
| CAT B | 0.23 |
| CAT C | 0.42 |
| CAT D | 0.61 |
| ADD 1 | 0.46 |
| water | 3.29 |

In the examples, the components of the B-side (see Table 1 above) were accurately weighed into a suitable container and mixed using an air driven two blade mixer. The resultant mixture was then taken to the metering equipment. The metering equipment was flushed with the mixture and calibrated for the desired foam index.

The mixture was mixed with the isocyanate using high pressure metering equipment (HENNECKE HK 100) and a Hennecke MQ-12-2 self-cleaning mixhead. Process settings were as follows:

TEMPERATURE B-side: 77°–95° F.
TEMPERATURE Iso: 77°–95° F.
MIX PRESSURES B-side/ISO: 1000–2000 psi
MOLD TEMPERATURE (°F.): 100°–130° F.
MOLD RELEASE: Permamold 2023SD
DEMOLD TIME: 5–7 mins.

The reaction mixture was metered into a 15 inch×15 inch×4 inch mold (which had been previously sprayed with the mold release agent) in an amount sufficient to give the desired foam density. The mold was then closed and the foam part demolded after the reaction was complete. The parts were labelled and tested for physical properties. The parts were aged under standard ASTM conditions (50% RH, 72°–74° F.) for three days. The parts were then tested according to ASTM 3574.

The results obtained were as reported in the following tables.

TABLE 2

| Example | 1 | 2 | 3 | 4 | 5 |
|---|---|---|---|---|---|
| Polyol Blend | 1 | 1 | 1 | 1 | 1 |
| Isocyanate | 85% A + 15% F | 85% B + 15% F | 85% C + 15% F | 85% D + 15% F | E |
| Isocyanate Index | 100 | 100 | 100 | 100 | 100 |
| RESULTS | | | | | |
| Molded Density (pcf) | 3.6 | 3.6 | 3.6 | 3.6 | 3.5 |
| Core Density | 3.2 | 3.45 | 3.4 | 3.5 | 3.4 |
| Tensile Strength (psi) | 31 | 32 | 31 | 25 | 18 |
| Elongation (%) | 128 | 124 | 115 | 135 | 95 |
| Tear Strength (lbf/in) | 3.6 | 3.7 | 3.6 | 3.7 | 1 |
| Compression Set (%) | 10.5 | 10.3 | 10.3 | 14 | 4–7 |
| ILD 25% (lbs) | 80 | 93 | 87 | 67 | 57 |

TABLE 3

| Example | 6 | 7 | 8 |
|---|---|---|---|
| Polyol Blend | 1 | 1 | 1 |
| Isocyanate | 85% B + 15% F | 85% B + 15% F | E |
| Isocyanate Index | 100 | 100 | 100 |
| RESULTS | | | |
| Molded Density (pcf) | 3.6 | 3.5 | 3.5 |
| Core Density | 3.45 | 3.4 | 3.4 |
| Tensile Strength (psi) | 32 | 30 | 18 |
| Elongation (%) | 1.24 | 118 | 95 |
| Tear Strength (lbf/in) | 3.7 | 2.6 | 1 |
| Compression Set (%) | 10.3 | 11.4 | 4.0 to 7.0 range |
| ILD 25% (lbs) | 93 | 81 | 57 |

TABLE 4

| Example | 9 | 10 | 11 |
|---|---|---|---|
| Polyol Blend | 1 | 1 | 1 |
| Isocyanate | 75% C + 25% F | 75% C + 25% G | 100% E |
| Isocyanate Index | 100 | 100 | 100 |
| RESULTS | | | |
| Molded Density (pcf) | 3.5 | 3.5 | 3.5 |
| Core Density | 3.4 | 3.4 | 3.4 |
| Tensile Strength (psi) | 29 | 17 | 18 |
| Elongation (%) | 114 | 65 | 95 |
| Tear Strength (lbf/in) | 2 | 2.3 | 1 |
| Compression Set (%) | 10.5 | 11.8 | 4–7 |
| ILD 25% (lbs) | 82 | 67 | 57 |

The foams produced according to the present invention offer significant advantages in comparison to the state-of-the-art foams. For example, a comparison of Example 1 vs. Example 5 demonstrates that, at the same molded density, foams produced in accordance with the present invention are characterized by tensile strengths which are 72% higher, tear strengths which are 260% higher, and elongations which are 35% higher. Thus, the foams of the present invention offer significant advantages in commercial applications, resulting in better resilience, lower wastage especially due to tearing during demold and use in more robust applications. Hardness values are also 40% higher. Therefore, the systems of the present invention do not require the addition of the more expensive polymer polyols to increase hardness at these same densities.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A flexible foam prepared by reacting:
A) a stable liquid allophanate modified polyisocyanate prepolymer blend having an isocyanate group content of from about greater than 11 to less than about 32% by weight, and comprising:
   a) an allophanate-group containing diisocyanate having an isocyanate group content of about 12 to about 31%;
   b) a polyether polyol having a hydroxyl functionality of from about 1.5 to about 4, and a molecular weight of about 100 to about 10,000; and
   c) a polymethylene poly(phenyl isocyanate) having an isocyanate group content of about 28 to about 33%;
with
B) an isocyanate-reactive component comprising:
   1) from about 80 to about 99.999% by weight, based on the total weight of component B), of one or more polyether polyols having hydroxyl functionalities of from about 1.5 to 6, and molecular weights of from about 1,000 to about 10,000, and
   2) from about 0.001 to about 20% by weight, based on the total weight of component B), of one or more organic compounds having molecular weights of from 90 to less than 1,000, and containing from 2 to 4 isocyanate-reactive groups,
in the presence of
C) a blowing agent, with the amounts of components A), B) and C) being such that the isocyanate index is from 60 to 120.

2. The flexible foam of claim 1, wherein component A) said stable liquid allophanate modified polyisocyanate prepolymer blend has an isocyanate group content of from at least about 11% to less than 32% by weight, and comprises:
1) from 65% to 98% by weight of an isocyanate-terminated allophanate modified prepolymer having an isocyanate group content of about 11% to about 30% by weight, and being prepared by reacting:
   a) an allophanate-group containing diisocyanate having an isocyanate group content of from about 12% to about 31% by weight, and being prepared by reacting an aliphatic and/or aromatic alcohol with a diphenylmethane diisocyanate comprising:
      i) from 0 to 60% by weight of 2,4'-diphenylmethane diisocyanate,
      ii) no more than 6% by weight of 2,2'-diphenylmethane diisocyanate,
      and
      iii) the balance being 4,4'-diphenylmethane diisocyanate, with the %'s by weight of A)a)i), A)a)ii) and A)a)iii) totalling 100%,
   b) a polyether polyol having hydroxyl functionalities of from about 1.5 to about 4 and molecular weights of about 100 to about 10,000,
   and
2) from 2% to 35% by weight of a polymethylene poly(phenyl isocyanate) having an isocyanate group content of about 28% to about 33%, and comprising:

i) from 0 to 50% by weight of 2,4'-diphenylmethane diisocyanate, ii) no more than 6% by weight of 2,2'-diphenylmethane diisocyanate, iii) from 20 to 80% by weight of 4,4'-diphenylmethane diisocyanate, and iv) from 10 to 70% by weight of higher functional isocyanates of the diphenylmethane series, with the %'s by weight of A)2)i), A)2)ii), A)2)iii) and A)2)iv) totalling 100% by weight.

3. The flexible foam of claim 1, wherein component A) said stable liquid allophanate modified polyisocyanate prepolymer blend has an isocyanate group content of from greater than 11 to less than 32% by weight, and comprises the reaction product of:

1) an isocyanate blend prepared by mixing a) from 65% to 98% by weight of a stable liquid allophanate-group containing diisocyanate having an isocyanate group content of from about 12% to about 31% by weight, and being prepared by reacting an aliphatic and/or an aromatic alcohol with a diphenylmethane diisocyanate comprising:

i) from 0 to 60% by weight of 2,4'-diphenylmethane diisocyanate, ii) no more than 6% by weight of 2,2'-diphenylmethane diisocyanate, and iii) the balance being 4,4'-diphenylmethane diisocyanate, with the %'s by weight of A)1)a)i), A)1)a)ii) and A)1)a)iii) totalling 100%, and c) from 2% to 35% by weight of a polymethylene poly (phenyl isocyanate) having an isocyanate group content of from about 28 to about 33% by weight, and comprising:

i) from 0 to 50% by weight of 2,4'-diphenylmethane diisocyanate, ii) no more than 6% by weight of 2,2'-diphenylmethane diisocyanate, iii) from 20 to 80% by weight of 4,4'-diphenylmethane diisocyanate, and iv) from 10 to 70% by weight of higher functional isocyanates of the diphenylmethane series, with the %'s by weight of A)1)c)i), A)1)c)ii), A)1)c)iii) and A)l)c)iv) totalling 100% by weight;

with 2) a polyether polyol having a hydroxyl functionality of from about 1.5 to about 4 and a molecular weight of about 100 to about 10,000.

4. The flexible foam of claim 1, wherein component A) said stable liquid allophanate modified polyisocyanate prepolymer blend has an isocyanate group content of from at least about 13.0% to less than about 30.5%.

5. The flexible foam of claim 1, wherein component A) said stable liquid allophanate modified polyisocyanate prepolymer blend has an isocyanate group content of from about 15.65% to about 29.1%.

6. The flexible foam of claim 1, wherein component B) said isocyanate-reactive component comprises:

1) from about 99.0 to 99.996% by weight of one or more polyether polyols having hydroxyl functionalities of from about 2 to about 3 and molecular weights of from about 1,000 to 6,200, and 2) from about 0.004 to about 1.0% by weight of one or more organic compounds having a molecular weight of from about 100 to about 500, and containing from about 2 to about 3 isocyanate-reactive groups.

7. A flexible molded foam prepared by reacting:

A) a stable liquid allophanate modified polyisocyanate prepolymer blend having an isocyanate group content of from about greater than 11 to less than about 32% by weight, and comprising:

a) an allophanate-group containing diisocyanate having an isocyanate group content of about 12 to about 31%;

b) a polyether polyol having a hydroxyl functionality of from about 1.5 to about 4, and a molecular weight of about 100 to about 10,000;

and c) a polymethylene poly(phenyl isocyanate) having an isocyanate group content of about 28 to about 33%;

with

B) an isocyanate-reactive component comprising:

1) from about 80 to about 99.999% by weight, based on the total weight of component B), of one or more polyether polyols having hydroxyl functionalities of from about 1.5 to 6, and molecular weights of from about 1,000 to about 10,000, and 2) from about 0.001 to about 20% by weight, based on the total weight of component B), of one or more organic compounds having molecular weights of from 90 to less than 1,000, and containing from 2 to 4 isocyanate-reactive groups, in the presence of C) a blowing agent, with the amounts of components A), B) and C) being such that the isocyanate index is from 60 to 120.

8. The flexible molded foam of claim 7, wherein component A) said stable liquid allophanate modified polyisocyanate prepolymer blend having an isocyanate group content of from at least about 11% to less than 32% by weight, and comprises:

1) from 65% to 98% by weight of an isocyanate-terminated allophanate modified prepolymer having an isocyanate group content of about 11% to about 30% by weight, and being prepared by reacting:

a) an allophanate-group containing diisocyanate has an isocyanate group content of from about 12% to about 31% by weight, and being prepared by reacting an aliphatic and/or aromatic alcohol with a diphenylmethane diisocyanate comprising:

i) from 0 to 60% by weight of 2,4'-diphenylmethane diisocyanate, ii) no more than 6% by weight of 2,2'-diphenylmethane diisocyanate, and iii) the balance being 4,4'-diphenylmethane diisocyanate, with the %'s by weight of A)a)i), A)a)ii) and A)a)iii) totalling 100%, b) a polyether polyol having hydroxyl functionalities of from about 1.5 to about 4 and molecular weights of about 100 to about 10,000, and 2) from 2% to 35% by weight of a polymethylene poly (phenyl isocyanate) having an isocyanate group content of about 28% to about 33%, and comprising:

i) from 0 to 50% by weight of 2,4'-diphenylmethane diisocyanate, ii) no more than 6% by weight of 2,2'-diphenylmethane diisocyanate, iii) from 20 to 80% by weight of 4,4'-diphenylmethane diisocyanate, and iv) from 10 to 70% by weight of higher functional isocyanates of the diphenylmethane series, with the %'s by weight of A)2)i), A)2)ii), A)2)iii) and A)2)iv) totalling 100% by weight.

9. The flexible molded foam of claim 7, wherein component A) said stable liquid allophanate modified polyisocyanate prepolymer blend has an isocyanate group content of from greater than 11 to less than 32% by weight, and comprises the reaction product of:

1) an isocyanate blend prepared by mixing
   a) from 65% to 98% by weight of a stable liquid allophanate-group containing diisocyanate having an isocyanate group content of from about 12% to about 31% by weight, and being prepared by reacting an aliphatic and/or an aromatic alcohol with a diphenylmethane diisocyanate comprising:
      i) from 0 to 60% by weight of 2,4'-diphenylmethane diisocyanate,
      ii) no more than 6% by weight of 2,2'-diphenylmethane diisocyanate,
      and
      iii) the balance being 4,4'-diphenylmethane diisocyanate,
      with the %'s by weight of A)1)a)i), A)1)a)ii) and A)1)a)iii) totalling 100%,
   and
   c) from 2% to 35% by weight of a polymethylene poly(phenyl isocyanate) having an isocyanate group content of from about 28 to about 33% by weight, and comprising:
      i) from 0 to 50% by weight of 2,4'-diphenylmethane diisocyanate,
      ii) no more than 6% by weight of 2,2'-diphenylmethane diisocyanate,
      iii) from 20 to 80% by weight of 4,4'-diphenylmethane diisocyanate,
      and
      iv) from 10 to 70% by weight of higher functional isocyanates of the diphenylmethane series,
      with the %'s by weight of A)1)c)i), A)1)c)ii), A)1)c)iii) and A)1)c)iv) totalling 100% by weight;
with
2) a polyether polyol having a hydroxyl functionality of from about 1.5 to about 4 and a molecular weight of about 100 to about 10,000.

10. The flexible molded foam of claim 7, wherein component A) said stable liquid allophanate modified polyisocyanate prepolymer blend has an isocyanate group content of from at least about 13.0% to less than about 30.5%.

11. The flexible molded foam of claim 7, wherein component A) said stable liquid allophanate modified polyisocyanate prepolymer blend has an isocyanate group content of from about 15.65% to about 29.1%.

12. The flexible molded foam of claim 7, wherein component B) said isocyanate-reactive component comprises:
1) from about 99.0 to 99.996% by weight of one or more polyether polyols having hydroxyl functionalities of from about 2 to about 3 and molecular weights of from about 1,000 to 6,200,
and
2) from about 0.004 to about 1.0% by weight of one or more organic compounds having a molecular weight of from about 100 to about 500, and containing from about 2 to about 3 isocyanate-reactive groups.

13. A process for the production of a flexible foam comprising reacting:

A) a stable liquid allophanate modified polyisocyanate prepolymer blend having an isocyanate group content of from about greater than 11 to less than about 32% by weight, and comprising:
   a) an allophanate-group containing diisocyanate having an isocyanate group content of about 12 to about 31%;
   b) a polyether polyol having a hydroxyl functionality of from about 1.5 to about 4, and a molecular weight of about 100 to about 10,000;
   and
   c) a polymethylene poly(phenyl isocyanate) having an isocyanate group content of about 28 to about 33%;
with
B) an isocyanate-reactive component comprising:
   1) from about 80 to about 99.999% by weight, based on the total weight of component B), of one or more polyether polyols having hydroxyl functionalities of from about 1.5 to 6, and molecular weights of from about 1,000 to about 10,000,
   and
   2) from about 0.001 to about 20% by weight, based on the total weight of component B), of one or more organic compounds having molecular weights of from 90 to less than 1,000, and containing from 2 to 4 isocyanate-reactive groups,
in the presence of
C) a blowing agent,
with the amounts of components A), B) and C) being such that the isocyanate index is from 60 to 120.

14. The process of claim 13, wherein component A) said stable liquid allophanate modified polyisocyanate prepolymer blend has an isocyanate group content of from at least about 11% to less than 32% by weight, and comprises:

1) from 65% to 98% by weight of an isocyanate-terminated allophanate modified prepolymer having an isocyanate group content of about 11% to about 30% by weight, and being prepared by reacting:
   a) an allophanate-group containing diisocyanate having an isocyanate group content of from about 12% to about 31% by weight, and being prepared by reacting an aliphatic and/or aromatic alcohol with a diphenylmethane diisocyanate comprising:
      i) from 0 to 60% by weight of 2,4'-diphenylmethane diisocyanate,
      ii) no more than 6% by weight of 2,2'-diphenylmethane diisocyanate,
      and
      iii) the balance being 4,4'-diphenylmethane diisocyanate, with the %'s by weight of A)a)i), A)a)ii) and A)a)iii) totalling 100%,
   b) a polyether polyol having hydroxyl functionalities of from about 1.5 to about 4 and molecular weights of about 100 to about 10,000,
and
2) from 2% to 35% by weight of a polymethylene poly(phenyl isocyanate) having an isocyanate group content of about 28% to about 33%, and comprising:
   i) from 0 to 50% by weight of 2,4'-diphenylmethane diisocyanate,
   ii) no more than 6% by weight of 2,2'-diphenylmethane diisocyanate, iii) from 20 to 80% by weight of 4,4'-diphenylmethane diisocyanate, and iv) from 10 to 70% by weight of higher functional isocyanates of the diphenylmethane series, with the %'s by weight of A)2)i), A)2)ii), A)2)iii) and A)2)iv) totalling 100% by weight.

15. The process of claim 13, wherein component A) said stable liquid allophanate modified polyisocyanate prepolymer blend, has an isocyanate group content of from greater than 11 to less than 32% by weight, and comprises the reaction product of:

1) an isocyanate blend prepared by mixing a) from 65% to 98% by weight of a stable liquid allophanate-group containing diisocyanate having an isocyanate group content of from about 12% to about 31% by weight, and being prepared by reacting an aliphatic and/or an aromatic alcohol with a diphenylmethane diisocyanate comprising:

i) from 0 to 60% by weight of 2,4'-diphenylmethane diisocyanate, ii) no more than 6% by weight of 2,2'-diphenylmethane diisocyanate, and iii) the balance being 4,4'-diphenylmethane diisocyanate, with the %'s by weight of A)1)a)i), A)1)a)ii) and A)1)a)iii) totalling 100%, and c) from 2% to 35% by weight of a polymethylene poly (phenyl isocyanate) having an isocyanate group content of from about 28 to about 33% by weight, and comprising:

i) from 0 to 50% by weight of 2,4'-diphenylmethane diisocyanate, ii) no more than 6% by weight of 2,2'-diphenylmethane diisocyanate, iii) from 20 to 80% by weight of 4,4'-diphenylmethane diisocyanate, and iv) from 10 to 70% by weight of higher functional isocyanates of the diphenylmethane series, with the %'s by weight of A)1)c)i), A)1)c)ii), A)1)c)iii) and A)1)c)iv) totalling 100% by weight;

with 2) a polyether polyol having a hydroxyl functionality of from about 1.5 to about 4 and a molecular weight of about 100 to about 10,000.

16. The process of claim 13, wherein component A) said stable liquid allophanate modified polyisocyanate prepolymer blend has an isocyanate group content of from at least about 13.0% to less than about 30.5%.

17. The process of claim 13, wherein component A) said stable liquid allophanate modified polyisocyanate prepolymer blend has an isocyanate group content of from about 15.65% to about 29.1%.

18. The process of claim 13, wherein component B) said isocyanate-reactive component comprises:

1) from about 99.0 to 99.996% by weight of one or more polyether polyols having hydroxyl functionalities of from about 2 to about 3 and molecular weights of from about 1,000 to 6,200, and 2) from about 0.004 to about 1.0% by weight of one or more organic compounds having a molecular weight of from about 100 to about 500, and containing from about 2 to about 3 isocyanate-reactive groups.

19. A process for the production of a flexible molded foam comprising reacting:

A) a stable liquid allophanate modified polyisocyanate prepolymer blend having an isocyanate group content of from about greater than 11 to less than about 32% by weight, and comprising:

a) an allophanate-group containing diisocyanate having an isocyanate group content of about 12 to about 31%;

b) a polyether polyol having a hydroxyl functionality of from about 1.5 to about 4, and a molecular weight of about 100 to about 10,000;

and c) a polymethylene poly(phenyl isocyanate) having an isocyanate group content of about 28 to about 33%;

with

B) an isocyanate-reactive component comprising:

1) from about 80 to about 99.999% by weight, based on the total weight of component B), of one or more polyether polyols having hydroxyl functionalities of from about 1.5 to 6, and molecular weights of from about 1,000 to about 10,000, and 2) from about 0.001 to about 20% by weight, based on the total weight of component B), of one or more organic compounds having molecular weights of from 90 to less than 1,000, and containing from 2 to 4 isocyanate-reactive groups, in the presence of C) a blowing agent, with the amounts of components A), B) and C) being such that the isocyanate index is from 60 to 120.

20. The process of claim 19, wherein component A) said stable liquid allophanate modified polyisocyanate prepolymer blend having an isocyanate group content of from at least about 11% to less than 32% by weight, and comprises:

1) from 65% to 98% by weight of an isocyanate-terminated allophanate modified prepolymer having an isocyanate group content of about 11% to about 30% by weight, and being prepared by reacting:

a) an allophanate-group containing diisocyanate having an isocyanate group content of from about 12% to about 31% by weight, and being prepared by reacting an aliphatic and/or aromatic alcohol with a diphenylmethane diisocyanate comprising:

i) from 0 to 60% by weight of 2,4'-diphenylmethane diisocyanate, ii) no more than 6% by weight of 2,2'-diphenylmethane diisocyanate, and iii) the balance being 4,4'-diphenylmethane diisocyanate, with the %'s by weight of A)a)i), A)a)ii) and A)a)iii) totalling 100%, b) a polyether polyol having hydroxyl functionalities of from about 1.5 to about 4 and molecular weights of about 100 to about 10,000, and 2) from 2% to 35% by weight of a polymethylene poly (phenyl isocyanate) having an isocyanate group content of about 28% to about 33%, and comprising:

i) from 0 to 50% by weight of 2,4'-diphenylmethane diisocyanate, ii) no more than 6% by weight of 2,2'-diphenylmethane diisocyanate, iii) from 20 to 80% by weight of 4,4'-diphenylmethane diisocyanate, and iv) from 10 to 70% by weight of higher functional isocyanates of the diphenylmethane series, with the %'s by weight of A)2)i), A)2)ii), A)2)iii) and A)2)iv) totalling 100% by weight.

21. The process of claim 19, wherein component A) said stable liquid allophanate modified polyisocyanate prepolymer blend has an isocyanate group content of from greater than 11 to less than 32% by weight, and comprises the reaction product of:

1) an isocyanate blend prepared by mixing
  a) from 65% to 98% by weight of a stable liquid allophanate-group containing diisocyanate having an isocyanate group content of from about 12% to about 31% by weight, and being prepared by reacting an aliphatic and/or an aromatic alcohol with a diphenylmethane diisocyanate comprising:
    i) from 0 to 60% by weight of 2,4'-diphenylmethane diisocyanate,
    ii) no more than 6% by weight of 2,2'-diphenylmethane diisocyanate,
    and
    iii) the balance being 4,4'-diphenylmethane diisocyanate, with the %'s by weight of A)1)a)i), A)1)a)ii) and A)1)a)iii) totalling 100%,
  and
  c) from 2% to 35% by weight of a polymethylene poly(phenyl isocyanate) having an isocyanate group content of from about 28 to about 33% by weight, and comprising:
    i) from 0 to 50% by weight of 2,4'-diphenylmethane diisocyanate,
    ii) no more than 6% by weight of 2,2'-diphenylmethane diisocyanate,
    iii) from 20 to 80% by weight of 4,4'-diphenylmethane diisocyanate,
    and
    iv) from 10 to 70% by weight of higher functional isocyanates of the diphenylmethane series, with the %'s by weight of A)1)c)i), A)1)c)ii), A)1)c)iii) and A)1)c)iv) totalling 100% by weight;

with 2) a polyether polyol having a hydroxyl functionality of from about 1.5 to about 4 and a molecular weight of about 100 to about 10,000.

22. The process of claim 19, wherein component A) said stable liquid allophanate modified polyisocyanate prepolymer blend has an isocyanate group content of from at least about 13.0% to less than about 30.5%.

23. The process of claim 19, wherein component A) said stable liquid allophanate modified polyisocyanate prepolymer blend has an isocyanate group content of from about 15.65% to about 29.1%.

24. The process of claim 19, wherein component B) said isocyanate-reactive component comprises:

1) from about 99.0 to 99.996% by weight of one or more polyether polyols having hydroxyl functionalities of from about 2 to about 3 and molecular weights of from about 1,000 to 6,200, and 2) from about 0.004 to about 1.0% by weight of one or more organic compounds having a molecular weight of from about 100 to about 500, and containing from about 2 to about 3 isocyanate-reactive groups.

25. The flexible foam of claim 2, wherein said polyether polyol of component A)1)b) has molecular weights of about 150 to 6,200.

26. The flexible molded foam of claim 8, wherein said polyether polyol of component A)1)b) has molecular weights of about 150 to 6,200.

27. The process of claim 14, wherein said polyether polyol of component A)1)b) has molecular weights of about 150 to 6,200.

28. The process of claim 20, wherein said polyether polyol of component A)1)b) has molecular weights of about 150 to 6,200.

* * * * *